United States Patent [19]

Shafii-Kahany et al.

[11] 4,008,791
[45] Feb. 22, 1977

[54] TAKEUP REEL FOR COMBINED HOSE AND CABLE

[75] Inventors: Hooshang Shafii-Kahany, Portland; Larry D. McCart, Lake Oswego, both of Oreg.

[73] Assignee: Cascade Corporation, Portland, Oreg.

[22] Filed: Sept. 8, 1975

[21] Appl. No.: 610,931

[52] U.S. Cl. .................... 191/12.2 R; 137/355.12; 242/107

[51] Int. Cl.[2] ...................................... H02G 11/00

[58] Field of Search ............... 137/355.12, 355.16, 137/355.17, 355.26, 355.27; 191/12.2 R, 12.2 A; 242/86, 86.5 R, 107 R

[56] References Cited

UNITED STATES PATENTS

| | | | |
|---|---|---|---|
| 1,918,657 | 7/1933 | Millar | 191/12.2 R |
| 3,061,234 | 10/1962 | Morey | 191/12.2 R X |
| 3,314,562 | 4/1967 | Farmer | 137/355.12 X |
| 3,657,491 | 4/1972 | Ryder et al. | 191/12.2 R |
| 3,806,671 | 4/1974 | Anderson | 191/12.2 R |

FOREIGN PATENTS OR APPLICATIONS 691,817 5/1953 United Kingdom ...... 191/12.2 R X

*Primary Examiner*—Stephen G. Kunin
*Attorney, Agent, or Firm*—Kolisch, Hartwell, Dickinson & Stuart

[57] ABSTRACT

A takeup reel for a combination hydraulic hose and electrical cable including a rotatable storage portion for taking up and paying out hose and cable, a stationary mounting member on which the storage portion is mounted for rotation, and a rotatable connector providing a fluid connection between hose stored on the storage portion and a supply of hydraulic fluid external to the reel. A brushless electrical connection is provided between cable stored on the storage portion and a supply of electrical energy external to the reel by an interface cable which may be coiled in either of reverse directions about the axis of rotation for the storage portion. A cable housing for the interface cable is joined to the storage portion for rotation therewith. The interface cable includes a plurality of flexible conductor elements. The elements in that portion of the interface cable stored in the cable housing are joined in side-by-side relation to form a flat ribbon-like configuration, and in another portion of the cable the elements are unjoined to form a loose bundle. The unjoined portions of the elements extend through a passage generally parallel to the rotational axis for the line storing portion. The ribbon-like portion of the cable extends radially into the cable housing through a strain relief guide which is mounted for limited rotation about an axis substantially paralleling the rotational axis of the line-storing portion, thus to guide a stretch of the joined cable elements in either of opposite spirally wound directions.

5 Claims, 14 Drawing Figures

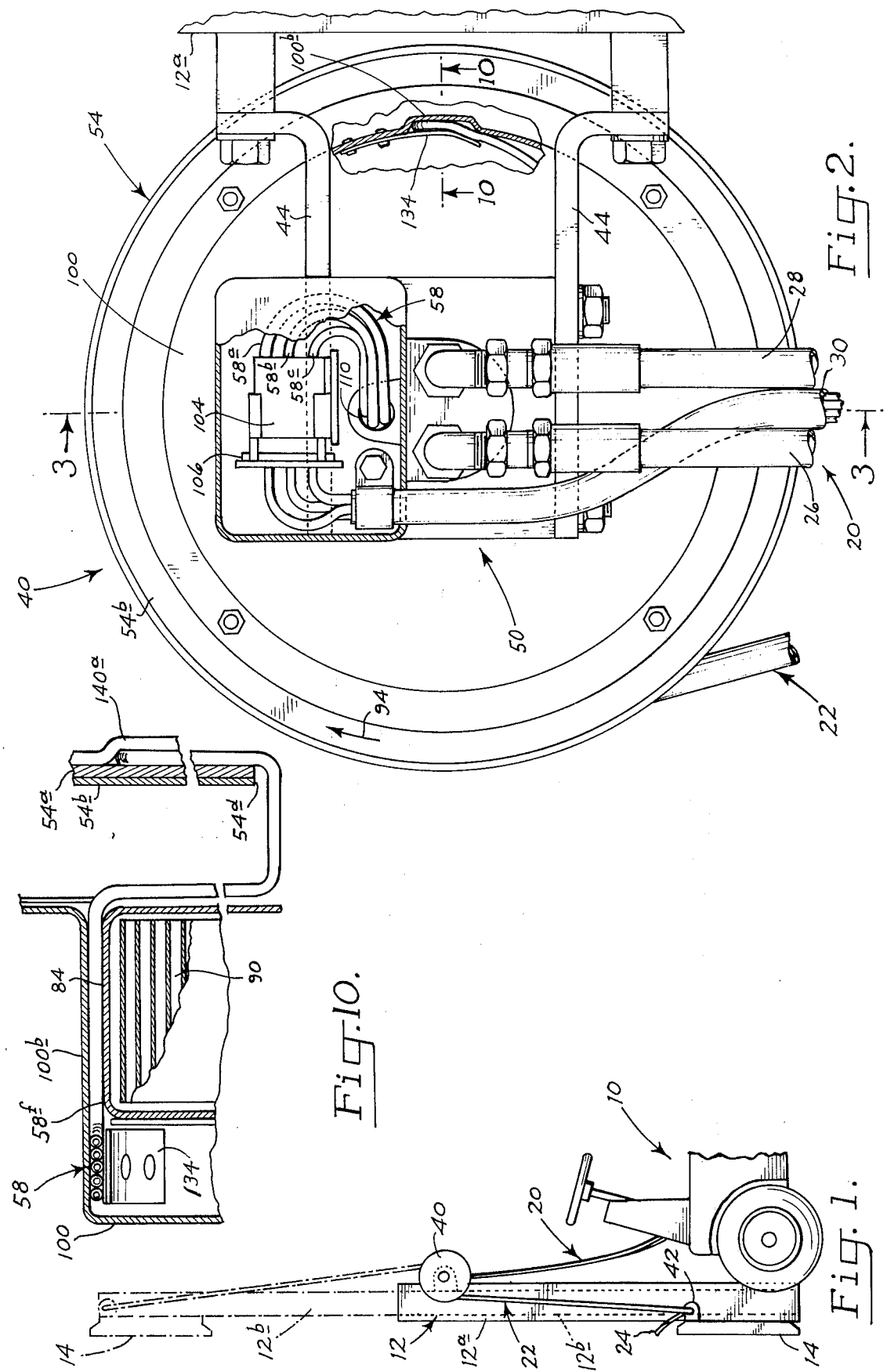

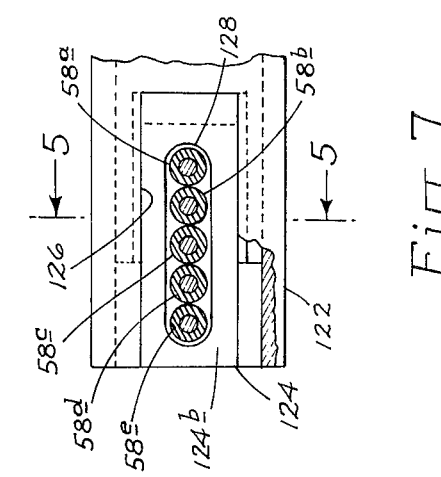
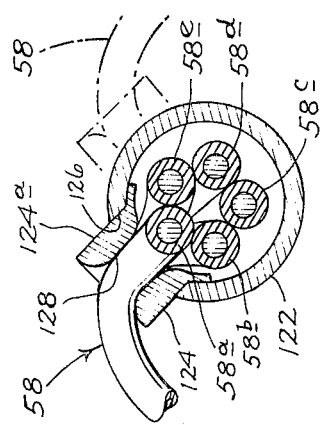
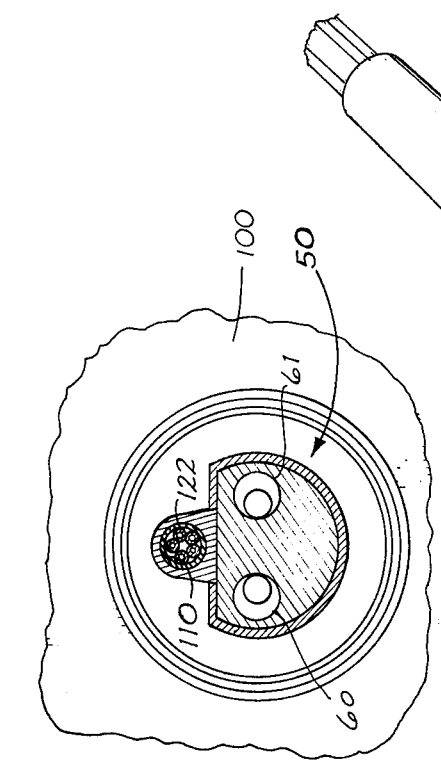
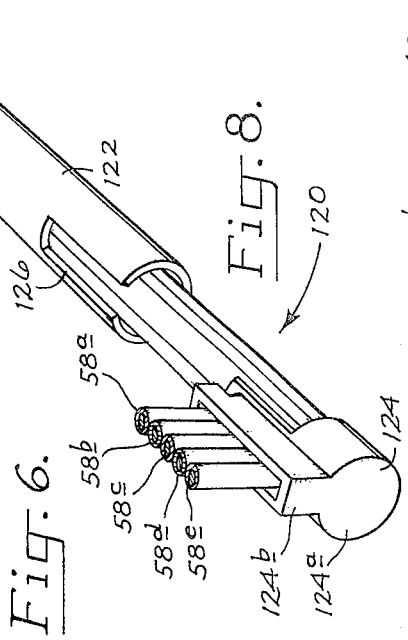
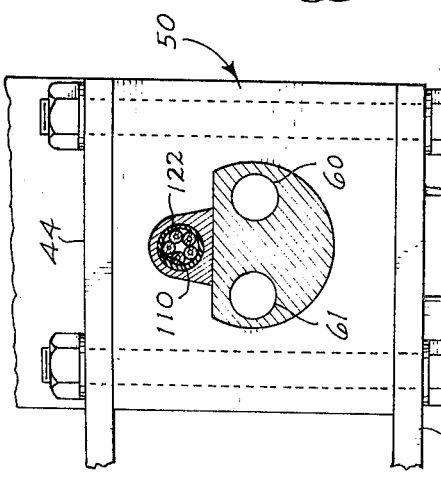
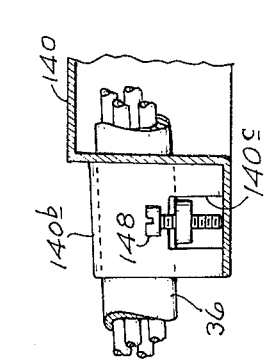
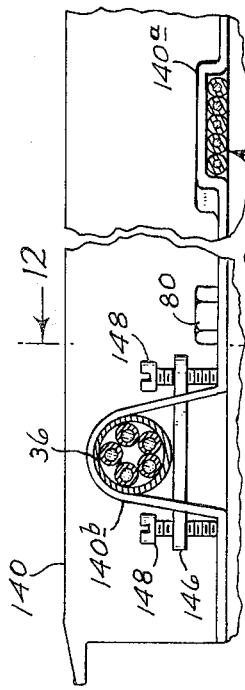

TAKEUP REEL FOR COMBINED HOSE AND CABLE

BACKGROUND AND SUMMARY OF THE INVENTION

This invention pertains to a takeup reel for combined hydraulic hose and electrical cable, and more particularly to such a reel in which a brushless electrical interconnection is provided between cable stored on the reel and a supply of electrical energy external to the reel.

In many instances, it is desirable to be able to provide an electrical interconnection between a pair of relatively rotatable members. In the past, such electrical connection generally has been provided by a plurality of relatively rotating brush elements in a rotatable connector. These, however, have not been altogether satisfactory, in that they often produce electrical arcing with its attendant fire hazards.

One instance in which it is particularly desirable to be able to provide an electrical interconnection between a pair of relatively rotating members is in a takeup reel on which line is stored for supplying energy between a pair of relatively movable parts. An example of such is found in the usual lift truck which has an upright mast on which is mounted a vertically shiftable carriage. The carriage may be adapted to carry various kinds of power-operated equipment, such as a side-shifter, clamping arms, a vacuum grab, etc. Such equipment may be either electrically or hydraulically operated, or require a combination of both forms of energy. In some lift trucks the mast is telescopic, in that the carriage may rise substantially fully the height of the mast, and then the mast itself may be extended telescopically to further raise the carriage.

In such apparatus, a line takeup reel may be mounted on the mast in such a manner that as the carriage moves along the mast, lines connected to the carriage are taken up on the reel, and as the carriage moves away from the reel, lines are paid out. Such a takeup reel generally has a rotatable storage portion for taking up and paying out line, and substantially stationary mounting member secured to the mast about which the storage portion rotates. Electrical energy and/or hydraulic fluid must pass from the substantially stationary mounting member to lines taken up and payed out from the rotatable portion throughout operation of the reel.

Previous devices for providing electrical interconnection between the substantially stationary mounting member and the rotatable storage portion generally have been through brushtype electrical connectors. Since these may produce electrical arcing, they produce a definite fire hazard when used in conjunction with certain hydraulic fluids.

A general object of the present invention is to provide a novel takeup reel having a rotatable storage portion for taking up and paying out line, a mounting member on which the storage portion is mounted for rotation thereabout, and a brushless electrical interconnection between a cable stored on the storage portion and a supply of electrical energy external to the reel, which electrical interconnection is so constructed as to overcome in a simple and economic manner the disadvantages of previous devices set out above.

Another object of the invention is to provide such a novel takeup reel characterized by a compact sandwich construction having axially joined subassemblies including a rotatable storage portion for taking up and paying out windings of a combined hose and cable, a housing for a biasing spring for urging unidirectional relative rotation between the storage portion and the means mounting it for rotation, and another housing for storing windings of an electrical interface cable providing a brushless interconnection between cable stored on the storage portion and an external electrical source. Such construction provides an unusually compact, simply constructed unit.

Yet another object is to provide such a takeup reel which further includes a novel strain relief guide through which a portion of the interface cable passes along a line generally paralleling the rotary axis for the storage portion of the reel, and from which a portion of the cable to be wound in spiral coils exits substantially radially of the assembly. The strain relief guide is mounted for limited rotation about an axis paralleling the axis of rotation for the assembly. Such rotation of the strain relief guide permits the guide to follow generally the lead of the portion of the cable extending outwardly therefrom to minimize bending stress in the cable, regardless of the direction in which it is wound in spiral coils during operation of the apparatus.

Explaining further, the interface cable may be arranged in a spiral extending in one direction in the cable housing when the lines on the storage portion of the reel are fully taken up. On rotation of the reel to pay out line, the interface cable begins to unwind from its spiral. When about half of the length of line on the storage portion of the reel is payed out, the spiral direction of the interface cable may reverse and be wound in this reverse direction until the line is fully payed out. The provision of such reverse spiraling of the interface cable permits maximum pay out of line from the reel with a minimum length of interface cable being required. When the spiraling direction of the interface cable reverses the rotatable strain relief guide rotates with the interface cable toward its new direction to minimize bending stress on the cable.

A more specific object of the invention is to provide such a takeup reel in which the interface cable, in order to accommodate the usual multiple-element electrical cable, includes a plurality of elongate, flexible elements having portions extending axially of the apparatus which are unjoined and extend as a loose bundle through a passage axially of the apparatus. Where the interface cable extends radially outwardly through the strain relief guide the multiple elements are joined in substantially side-by-side relationship to have a flat ribbon-like configuration whereby the same may lie in flat, substantially even spiral coils in the housing. Disposition of the interface cable elements as a loose bundle extending loosely through a passage axially of the assembly minimizes twisting strain on such elements when rotation of the strain relief guide occurs with reverse spiraling of the cable in the housing.

An advantage of the flat ribbon-like portion of the interface cable is that the same will lie in a neat coil within the housing, without tangling or overlapping of the windings during operation.

These and other objects and advantages of the present invention will become more fully apparent as the following description is read in conjunction with the drawings.

DESCRIPTION OF THE DRAWINGS

FIG. 1 is a simplified side illustration of the forward end of a lift truck having an upright mast on which is mounted a takeup reel according to an embodiment of the invention;

FIG. 2 is an enlarged side elevation of a takeup reel according to an embodiment of the invention, as seen from the side opposite that illustrated in FIG. 1;

FIG. 3 is a cross-sectional view taken generally along the line 3—3 in FIG. 1;

FIG. 4 is a side elevation of the reel taken from the side opposite that illustrated in FIG. 2;

FIG. 5 is a view taken generally along the line 5—5 in FIG. 3;

FIG. 6 is a view taken along the line 6—6 in FIG. 3;

FIG. 7 is an enlarged view taken along the line 7—7 of FIG. 3 showing a strain relief guide in the apparatus;

FIG. 8 is a perspective view of the strain relief guide showing portions thereof in a disassembled state;

FIG. 9 is a cross-sectional view taken along the line 9—9 in FIG. 7;

FIG. 10 is an enlarged cross-sectional view of a portion of the apparatus taken generally along the line 10—10 in FIG. 1 illustrating the routing path of a multiple element ribbon-like interface cable as it passes from a storage housing, past a spring housing, and thence to an interconnection with the rotatable storage portion of the apparatus;

FIG. 11 is an enlarged view taken along the line 11—11 in FIG. 4;

FIG. 12 is a cross-sectional view taken generally along the line 12—12 in FIG. 11; and FIGS. 13 and 14 are schematic illustrations of the interface cable as spirally wound in opposite directions during operation.

DETAILED DESCRIPTION OF THE INVENTION

Referring now to the drawings, and first more specifically to FIG. 1, at 10 is indicated generally the forward portion of a lift truck, on the forward end of which is mounted a telescopically extensible-contractible upright mast 12. The mast includes an outer stationary mast section 12a which telescopically receives an inner, vertically shiftable, mast section 12b. Although the outer mast section is referred to herein as being stationary, to bring out the fact that it does not move vertically, it should be understood that this section may be, and ordinarily is, mounted on the truck through a pivot connection enabling limited forward and rearward tipping.

A carriage 14 is mounted on the mast for vertical movement on the inner mast section. In industrial application, power-operated equipment may be mounted on the carriage for clamping onto or otherwise operating on loads supported by the lift truck. Since the particular type of equipment utilized forms no part of the invention such equipment has been omitted from the drawings for simplicity. It need be understood only that such equipment may require the supply of electrical and/or hydraulic energy thereto.

In FIG. 1 carriage 14 is illustrated in solid outline lowered fully on inner mast section 12b. The carriage may be adjusted infinitely between certain upper and lower limits. In dot-dash outline in the figure, the carriage and inner mast section are shown raised substantially above the uppermost end of outer section 12a of the mast.

Figures 3, 4, 13, 14:
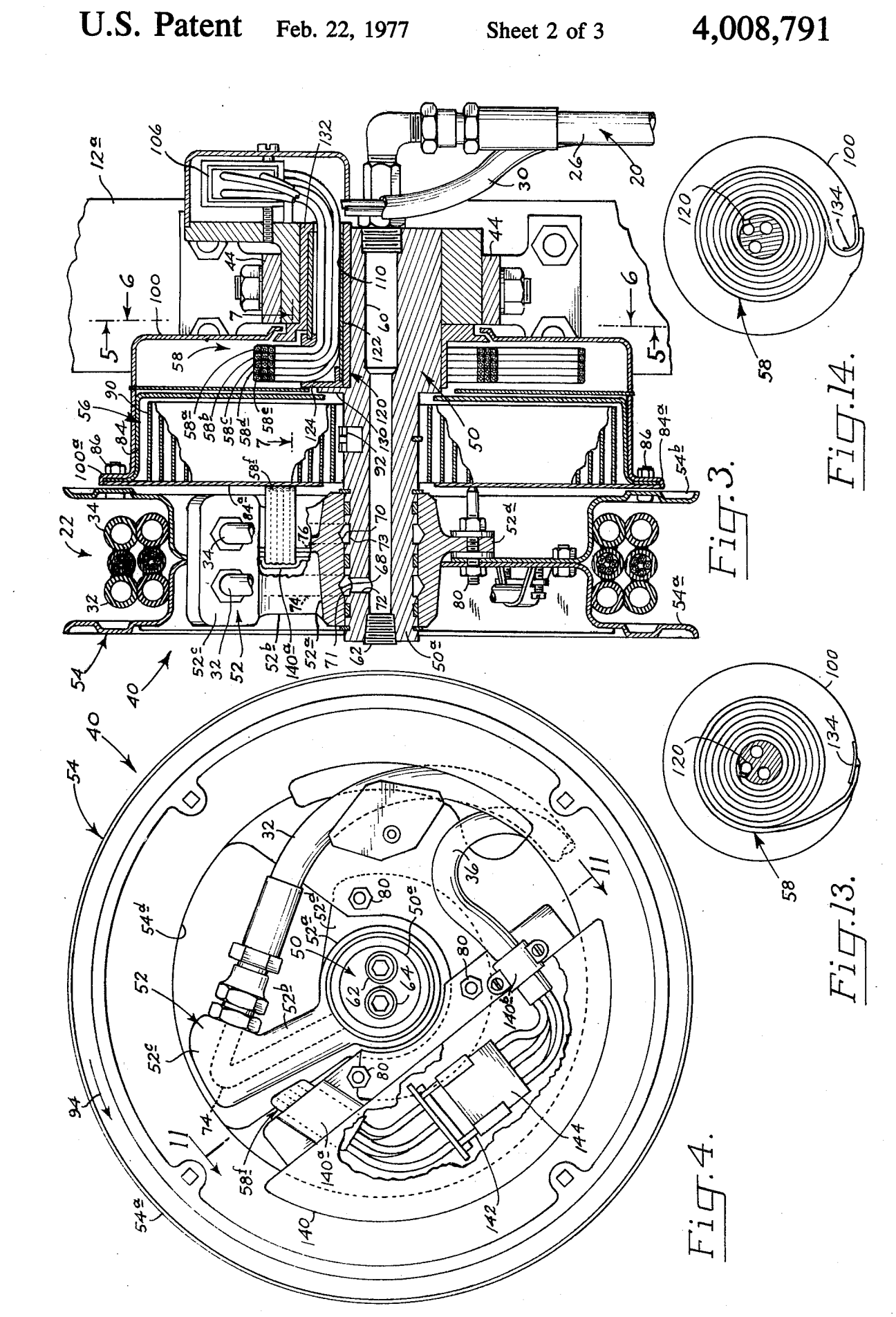

Energy for operating the equipment on the carriage is supplied through elongate, flexible line assemblies 20, 22, 24. Each of the line assemblies in the embodiment illustrated includes a pair of elongate, flexible hydraulic hoses and a multiple conductor electrical cable. The hoses and cable in each assembly are connected in side-by-side relationship, as best illustrated in FIG. 3, to form an integral unit which may be conveniently routed in the apparatus.

In line assembly 20 the hoses are indicated at 26, 28 and the electrical cable at 30. In line assembly 22 the hoses are indicated at 32, 34 with an electrical cable 36 secured therebetween. In the illustrated embodiment the electrical cables in the line assemblies each have five separate conductor elements extending therethrough.

Referring to FIG. 1, line assembly 22 extends between a takeup reel assembly 40 and a connector 42 through which it is secured to carriage 14 and connected with line assembly 24. Line assembly 24 would be connected to the equipment mounted on carriage 14.

Reel assembly 40 is constructed according to an embodiment of the invention and is secured through mounting brackets 44 to outer section 12a of the mast adjacent the top of section 12a (see FIGS. 1-3). The inner end portions of the hoses and cable of line assembly 22 are secured to and may be stored in windings on the reel assembly.

Referring to FIGS. 2, 3 and 4, reel assembly 40 contains, basically, five components: a mounting, or journal, member 50; a hose, or line, connector, 52; a rotary reel, or line-storage portion, 54; a spring assembly 56; and an electrical interface cable 58.

Mounting member 50 is secured to mounting brackets 44, and thus is held in a substantially stationary position relative to mast 12. The end portion 50a of mounting member 50 spaced from mounting brackets 44 is cylindrical. A pair of elongate spaced-apart bores, such as those indicated at 60, 61 in FIGS. 3, 5, 6, extend axially through mounting member 50. Pipe plugs 62, 64 close off one set of ends of the bores, while the opposite set of ends of the bores have hoses 26, 28 connected thereto through conventional right-angle couplings.

Hose connector 52 is a unitary part formed, as by casting to have the configuration illustrated in FIGS. 3 and 4. The connector includes a central, generally cylindrical hub 52a from which radiates an elongate neck 52b that joins with a head, or hose attaching means, 52c. Also included is a radially and partially circumferentially extending flange 52d which joins with both hub 52a and neck 52b.

The hose connector is mounted for rotation on the cylindrical end portion 50a of mounting member 50. Formed inside hub 52a is a pair of axially spaced, circumferentially extending grooves 68, 70 which confront and communicate with like grooves 71, 73 in mounting member 50. A port 72 extends radially outwardly from bore 60 into groove 71, and a similar port connects bore 61 with groove 73. Grooves 68, 70 in hub 52a communicate through generally radially extending, spaced-apart bores 74, 76, formed in neck 52b with hoses 32, 34 of line assembly 22, respectively, connected to head 52c. The bores and grooves thus provide fluid passages between hose 26 and hose 32, and between hose 28 and hose 34 when the hoses of line assembly 22 are connected as illustrated to head 52c of the hose connector.

Line-storage portion 54 includes two axially confronting, generally circular reel sections 54a, 54b which are joined together to define a line-storing region extending circumferentially thereabout in which line assembly 22 may be stored in spirally wound coils. Reel sections 54a, 54b are secured together and to flange 52d of the hose connector by bolt and nut combinations 80. As a consequence, the hose connector and line-storage portion are adapted to turn as a unit in the assembly about mounting member 50.

As is best seen in FIG. 4, openings in the radially inwardly facing surfaces of reel sections 54a, 54b provide a passage through which inner end portions of hoses 32, 34 and cable 36 of line assembly 22 may extend to be connected within the central portion of the reel assembly.

Spring assembly 56 includes a substantially cylindrical housing 84 having a flange 84a which rests against one side of reel section 54b. A central opening in the spring housing provides clearance for mounting member 50 to extend therethrough. Bolt and nut combinations 86 secure housing 84 to the rotatable line-storage portion for rotation therewith.

A coil biasing spring 90 is disposed within housing 84. Spring 90 has its outer end secured to the outer part of housing 84, and its inner end secured to mounting member 50 by a catch 92. Spring 90 tends to urge rotation of line-storage portion 54 and hose connector 52 generally in the direction of arrow 94 in FIGS. 2 and 4. Rotation of these parts in such a direction serves to take up line assembly 22 in spirally wound coils on line storage portion 54. A more detailed description of a somewhat similar mounting member, hose connector, line storage portion and spring assembly will be found in U.S. Pat. No. 3,782,409, dated Jan. 1, 1974, entitled "Line Take-Up Assembly".

Referring again to FIGS. 2 and 3, a substantially cylindrical cable housing 100, having a radially projecting flange 100a thereon, provides a guide and housing region for interface cable 58. Housing 100 slips over spring housing 54 and is secured to reel section 54b through nut and bolt combinations 86 also. The cable housing thus is rotatable with the line-storage portion of the reel. A central opening in the cable housing receives mounting member 50 therethrough to permit rotation with the line-storage portion. The line-storage portion of the reel assembly, the spring assembly, the interface cable and its housing thus are assembled in an axially aligned, sandwich-like assembly for rotation on the mounting member, providing an unusually compact unit.

Still referring to FIGS. 2 and 3, interface cable 58 includes a plurality of elongate flexible conductor elements, with one of such conductor elements included for each element in the cable, or line, 36 stored on the line-storing portion of the reel assembly. In the illustrated embodiment cable 36 in line assembly 22 includes five conductor elements, and thus interface cable 58 also is provided with five separate conductor elements 58a, 58b, 58c, 58d, 58e.

Throughout a major portion of the length of interface cable 58 the conductor elements are joined together in substantially side-by-side contiguity to have a flat ribbon-like configuration. When wound in spiral windings within housing 84 as illustrated in FIGS. 3, 13 and 14 such ribbon-like configuration provides flat, compact, untangled coils in the housing. The windings of the ribbon-like portions of interface cable 58 in cable housing 84 lie in a plane generally paralleling that in which line assembly 22 is stored on the line storing portion of the reel assembly.

Another portion of interface cable 58 takes the form of a loose nonjoining bundle of elements. The outer ends of the elements in the nonjoined bundle, as seen in FIG. 2, are joined to a connector part 104. The ends of similar elements in cable 30 are joined to a connector part 106 to provide a disconnectable electrical interconnection between the elements of cable 30 and the elements of interface cable 58.

An elongate bore 110 extends through mounting member 50 generally parallel to the rotational axis for the reel assembly. Bore 110 has an inner end communicating with the cable storage space provided by housing 100 and an outer end opening to the region of connector parts 104, 106. The loose, nonjoined bundle of elements 58a, 58b, 58c, 58d, 58e extends axially through bore 110, as best illustrated in FIGS. 3, 5 and 6.

At 120 in FIGS. 3 and 8 is indicated a strain relief guide through which a portion of interface cable 58 extends.

The strain relief guide includes an elongate cylindrical tube 122 which is rotatably received in bore 110 for rotation about an axis substantially paralleling the rotational axis for the reel assembly. a collar member 124 having the configuration illustrated generally in FIGS. 7, 8 and 9 is adapted to be received in one end of tube 122. As is illustrated, collar member 124 has a cylindrical end portion 124a adapted to be slidably received in an end of tube 122 and a rectangular collar portion 124b which projects outwardly through a slot 126 in tube 122 when assembled, as illustrated in FIGS. 7 and 9. An elongate slot 128 snugly receives conductor elements 58a–58e therethrough as illustrated in FIGS. 3, 7, 8 and 9. As is seen the portion of the interface cable which extends generally parallel to the rotational axis of the reel assembly through tube 122 and bore 110 is a loose, nonjoined bundle of elements, whereas the cable changes to its joined ribbon-like configuration where it extends radially outwardly through slot 128 in collar member 124 into the line storing region provided for the interface cable by housing 100.

Referring to FIG. 3 flanges 130, 132 at opposite ends of bore 110 confine tube 122 and collar 124 in the bore. Portions of the mounting member spaced laterally of opposite sides of collar portion 124b define limits for the rotation of tube 122 and collar 124 in the apparatus.

As is best seen in FIG. 9, the strain relief guide is mounted for limited rotation about the axis of tube 122 between a first position, as illustrated in solid outline, with the interface cable extending to the left of a vertical line in FIG. 9, and a second position as seen in dot-dashed outline in which the interface cable extends to the right of a vertical line. Such rotation of the strain relief guide, in conjunction with the change in the cable from a flat-ribbon configuration to a loose bundled configuration, is instrumental in reducing bending stress in cable 58 when it is wound in opposite directions with operation of the reel. Explaining further, when line assembly 22 is substantially fully paid out with carriage 14 at its lowermost position as illustrated in FIG. 1, interface cable 58 is wound in a spiral coil which proceeds in a counterclockwise direction from its center to its outer winding (see FIG. 13), and when the line assembly 22 is fully taken in on the reel, interface cable 58 is wound in a spiral coil which progresses in a clockwise, or reverse, direction from its inner to its outer winding as illustrated in FIG. 14. The rotation provided by the strain relief guide allows the portion of the interface cable extending radially from the collar member to be lead generally in the direction of the windings as it extends outwardly from the strain relief guide.

Referring to FIGS. 2 and 10, a bulge 100b in a peripheral portion of cable housing 100 permits a stretch 58f of the joined ribbon-like portion of interface cable 58 to make a turn of approximately 90° at the periphery of housing 100, extend from the region of cable housing 100 axially of the assembly past spring housing 84 and then radially inwardly toward the center of the assembly to a position adjacent an opening 54d in reel sections 54a, 54b. As is seen in FIGS. 3, 4, and 10 stretch 58f of the interface cable is bent about the side of reel section 54a opposite cable housing 100.

A flat leaf spring 134 secured to housing 100 adjacent bulge 100b presses against cable 58 to hold this portion of the cable in place relative to the cable housing. The strain relief guide and spring 134 define between them the length of cable 58 which may be wound in spiral coils within housing 100.

A connector housing 140 (see FIGS. 3, 4 and 11) secured by bolts 80 to reel section 54a has a formed receiving section 140a through which cable 58 extends. When bolts 80 are tightened, cable 58 is clamped tightly between receiving section 140a and reel section 54a, as is best seen in FIG. 11. Within housing 140 the ends of the elements of cable 58 again are separated from each other and joined to a connector part 142. The conductor elements of cable 36 of line assembly 22 similarly are joined to a connector part 144 within housing 140. Interconnection of these connector parts provides a disconnectable connection between the conductor elements of cable 58 and the conductor elements of cable 36.

An end portion of cable 36 extends through another formed receiving section 140b of housing 140 which has the configuration illustrated in FIGS. 11 and 12. Slots, such as that illustrated at 140c, are provided in opposite sides of receiving section 140b. A bar 146 extending through slots 140c engages the underside of cable 36. Screws 148 extending through threaded bores in bar 146 have lower ends which engage a flange of housing 140. Turning of screws 148 in one direction raises bar 146 to clamp cable 36 tightly therein.

Describing the operation of the apparatus, line assemblies, 20, 22 are connected to the reel assembly as described. Interface cable 58 provides a brushless interconnection between cable 30 of line assembly 20 and cable 36 of line assembly 22. Fluid flow passages are provided through assembly from hoses 26, 28 of line assembly 20 to hoses 32, 34, respectively, of line assembly 22.

With carriage 14 lowered as illustrated in FIG. 1, line assembly 22 is substantially fully paid out from the reel assembly. At such time, spring 90 urges rotation of the reel assembly in the direction of arrow 94 attempting to reel line assembly 22 onto the line-storing portion of the assembly. With the line fully payed out, interface cable 58 is wound in housing 100 in coils extending in one rotational direction, as illustrated in FIG. 13, and the collar portion of strain relief guide 120 is rotated to a position extending in generally the same direction of the innermost winding of cable 58.

As the carriage rises on the mast toward the reel assembly the spring causes rotation of the line-storing portion, spring housing and cable housing about mounting member 50 whereby line assembly 22 is wound in spiral coils in the line-storing portion. Cable 58 begins to uncoil from the winding direction illustrated in FIG. 13. As the carriage reaches a midpoint in its rise toward the top of the mast, interface cable 58 will have been substantially unwound from its coiled position as illustrated in FIG. 13 and will begin to coil in an opposite direction. Continued raising of mast 14 with further taking in of line assembly 22 results in wrapping of interface cable 58 in reverse direction spiral windings as illustrated in FIG. 14. With such construction the amount of interface cable required is substantially minimized.

Strain relief guide 120 being rotatable about an axis substantially paralleling the rotational axis for the reel assembly permits the portion of the interface cable radiating therefrom to extend outwardly from the strain relief guide generally in the direction of the winding of the cable at that time. Any wear which might occur to the portion of the interface cable extending outwardly from the stress relief guide thus is minimized by the rotation of the strain relief guide.

As the carriage and inner telescopic mast section 12b are raised toward the position illustrated in dot-dashed outline in FIG. 1 line assembly 22 again is paid out from the reel assembly against the urging of spring 90. As the line assembly is paid out interface cable 58 again is caused to rotate with the assembly whereby it uncoils and then wraps in reverse direction coils to permit full extension of line assembly 22.

Throughout such rotation of the reel assembly a brushless electrical interconnection is provided by interface cable 58 between the conductor elements of cable 30 in line assembly 20 and the conductor elements of cable 36 in line assembly 22. Such brushless electrical interconnection permits the supply of combined electrical and hydraulic fluid power to an attachment on the lift truck with little, if any, likelihood of fire occurring due to arcing of electrical contracts in the system. Significantly aiding, in respect of preventing arcing, is the strain relief function providing where the interface cable extends through the strain relief guide. Here, the cable passes in the form of a loose, non-joined bundle of conductors, and extends toward a connection with external electrical power. This construction minimizes the chance of conductor fatigue breakage.

The various important features which inhibit arcing offer the possibility of safely using a take-up reel for electrical cable in any fire-hazardous environment, including, among others, the specific environment shown herein of the combination of hydraulic hose and electrical cable. Those skilled in the art will readily appreciate the invention's utility in other settings.

Another important feature of the invention is that the proposed reel is axially quite compact. Thus, it can be included readily in conventional lift trucks and the like without protruding significantly from a side of a truck.

While a preferred embodiment of the invention has been described herein, it should be apparent to those skilled in the art that variations and modifications are possible without departing from the spirit of the invention.

What is claimed and desired to secure by letters patent is:

1. A takeup reel for combined hydraulic hose and electrical cable, such cable being of the kind including multiple conductive elements, said reel comprising a rotary storage portion for taking up and paying out such hose and cable, a mounting member mounting the storage portion for rotation thereon and accommodating attachment of the reel to an external structure, means accommodating a fluid connection between hose stored on said storage portion and a supply of hydraulic fluid external to said reel, and means accommodating a brushless electrical connection between cable stored on said storage portion and a supply of electrical energy external to said reel, said means comprising an interface cable including a different conductive element for each conductive element in cable stored on said storage portion, with the interface cable having a coiled portion with elements therein joined in substantial side-by-side contiguity and coiled about said mounting member, and a generally straight portion extending from said coiled portion along a line generally paralleling the rotary axis of said storage portion, and with the elements in said straight portion taking the form of a loose, nonjoined bundle, and strain relief means attached to said interface cable at the region of joinder of said coiled and straight portions, said strain relief means being mounted on said mounting member for limited rotation about an axis substantially paralleling the rotational axis of said storage portion.

2. A takeup reel for combined hydraulic hose and electrical cable comprising a mounting member, a rotary storage portion for taking up and paying out such hose and cable mounted for rotation on said mounting member, biasing spring disposed axially to one side of said storage portion and acting between the same and said mounting member for urging relative rotation between the two in one direction, a housing for said spring joined to and projecting axially away from said one side of said storage portion, interface cable means for accommodating a brushless, electrical connection between cable stored on said storage portion and an external supply of electrical power, said interface cable means including a portion disposed as a spiral winding about said mounting member on the opposite side of said spring housing from said storage portion, and a housing for said portion of said interface cable means joined for rotation as a unit with said storage portion and said spring housing, and including a space containing said interface cable means portion which space is disposed on said opposite side of said spring housing.

3. In a takeup reel for combined hydraulic hose and electrical cable which reel includes a biasing spring having a coiled portion for accommodating a brushless electrical connection between cable stored by the reel and an external supply of electrical power:

a mounting member extending along the rotational axis of the reel; and an axially compact sandwich assembly mounted for rotation on said mounting member, said sandwich assembly including a rotary storage portion for taking up and paying out such hose and cable, a housing for said coiled portion of said spring joined to and projecting axially away from one side of said storage portion, and a housing for said coiled portion of said interface cable joined for rotation as a unit with said storage portion and said spring housing, and projecting axially away from the side of said spring housing which is opposite said one side of storage portion.

4. In a takeup reel for a multiple-element line, where the reel includes a rotary line-storing portion, and a mounting member mounting the line-storing portion for rotation thereon and relative thereto and accommodating attachment of the reel to an external structure, means affording an operative connection between the elements in a line stored on said line-storing portion and structure external to the reel, said means comprising an elongated multiple-element interface line including a different element for each element in a line stored on said line-storing portion, said interface line including one stretch wherein its said elements are joined in substantial side-by-side contiguity to have a flat ribbon-like configuration, and another stretch joined to said one stretch wherein its said elements take the form of a loose nonjoined bundle, means defining a generally circular storage space on said reel to one side of said line-storing portion for storing a flat spiral winding of said one stretch of said interface line, which winding lies in a plane generally paralleling that in which line is stored on said line-storing portion, means defining a passage in said mounting member for receiving said other stretch of said interface line, said passage extending generally parallel to the rotational axis provided by the mounting member for the line-storing portion, and having an end communicating with said storage space, and strain-relief guide means attached to said interface line at the region of joinder of said one and other stretches, said guide means being mounted for limited rotation on said mounting member about an axis substantially paralleling the rotational axis of said line-storing portion, said guide means guiding said one stretch of said interface line into said storage space in said first-mentioned plane, and further guiding said other stretch of said interface line into said passage.

5. A take-up reel for line including electrical conductors comprising a mounting member, a rotary storage portion for taking up and paying out such line mounted for rotation on said mounting member, a biasing spring disposed axially to one side of said storage portion and acting between the same and said mounting member for urging relative rotation between the two in one direction, a housing for said spring joined to and projecting axially away from said one side of said storage portion, interface cable means for accommodating a brushless, electrical connection between electrical conductors in line stored on said storage portion and an external supply of electrical power, said interface cable means including a portion disposed as a spiral winding about said mounting member on the opposite side of said spring housing from said storage portion, and a housing for said portion of said interface cable means joined for rotation as a unit which said storage portion and said spring housing, and including a space containing said interface cable means portion which space is disposed on said opposite side of said spring housing.

* * * * *

UNITED STATES PATENT AND TRADEMARK OFFICE
CERTIFICATE OF CORRECTION

PATENT NO. : 4,008,791
DATED : February 22, 1977
INVENTOR(S) : Hooshang Shafii-Kahany et al.

It is certified that error appears in the above-identified patent and that said Letters Patent are hereby corrected as shown below:

Claim 2, line 42, before "biasing" insert -- a --;

claim 3, line 64, after "portion" insert -- , --; and claim 5, column 12, line 1, "which" should be --with--.

Signed and Sealed this

Seventh Day of June 1977

[SEAL]

Attest:

RUTH C. MASON
*Attesting Officer*

C. MARSHALL DANN
*Commissioner of Patents and Trademarks*